(12) United States Patent
Bengtsson et al.

(10) Patent No.: US 11,063,690 B2
(45) Date of Patent: Jul. 13, 2021

(54) SCHEDULER AND METHODS THEREIN FOR SCHEDULING DATA TRANSMISSION IN A WIRELESS COMMUNICATION SYSTEM

(71) Applicant: Telefonaktiebolaget LM Ericsson (publ), Stockholm (SE)

(72) Inventors: Jonas Bengtsson, Häljarp (SE); Milica Bogdanovic, Lund (SE); Jens Kongstad, Lund (SE); Dan Korsfeldt, Hässelby (SE); Karol Krakowiak, Lund (SE); Niklas Larsson, Flyinge (SE); Dejan Miljkovic, Solna (SE); Peter Nessrup, Åkarp (SE); Johan Svensson, Malmö (SE); Per-Inge Tallberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/463,272

(22) PCT Filed: Nov. 30, 2016

(86) PCT No.: PCT/EP2016/079196
§ 371 (c)(1),
(2) Date: May 22, 2019

(87) PCT Pub. No.: WO2018/099544
PCT Pub. Date: Jun. 7, 2018

(65) Prior Publication Data
US 2019/0288788 A1 Sep. 19, 2019

(51) Int. Cl.
H04L 1/00 (2006.01)
H04L 1/18 (2006.01)
(Continued)

(52) U.S. Cl.
CPC .......... *H04L 1/0005* (2013.01); *H04L 1/0003* (2013.01); *H04L 1/0009* (2013.01);
(Continued)

(58) Field of Classification Search
CPC ... H04L 1/1874; H04L 1/0026; H04L 1/0003; H04L 1/0009; H04L 1/0005;
(Continued)

(56) References Cited

U.S. PATENT DOCUMENTS

2006/0104201 A1 5/2006 Sundberg et al.
2008/0259833 A1 10/2008 Ozturk et al.
(Continued)

FOREIGN PATENT DOCUMENTS

EP 2529515 A1 12/2012

OTHER PUBLICATIONS

3GPP, "3rd Generation Partnership Project; Technical Specification Group Services and System Aspects; Policy and charging control architecture (Release 13)", 3GPP TS 23.203 V13.7.0, Mar. 2016, pp. 1-242.

*Primary Examiner* — Ricardo H Castaneyra
(74) *Attorney, Agent, or Firm* — Sage Patent Group

(57) ABSTRACT

A scheduler and method for scheduling data transmission in a wireless communication system are disclosed. The scheduler buffers data packets in a buffer and monitors status of the buffer. The buffered data packets will remain in the buffer, until the buffer contains a data packet which is associated with a priority level higher than a priority level of a predefined priority threshold. Then, the scheduler selects a modulation and coding scheme for the buffered data packets and sends the buffered data packets to a radio unit for transmission.

12 Claims, 4 Drawing Sheets

(51) Int. Cl.
 *H04W 24/08* (2009.01)
 *H04W 72/12* (2009.01)
 *H04W 52/02* (2009.01)

(52) U.S. Cl.
 CPC .......... *H04L 1/0017* (2013.01); *H04L 1/0018* (2013.01); *H04L 1/0026* (2013.01); *H04L 1/1874* (2013.01); *H04W 24/08* (2013.01); *H04W 52/0216* (2013.01); *H04W 52/0219* (2013.01); *H04W 72/1242* (2013.01); *H04W 72/1221* (2013.01); *H04W 72/1252* (2013.01); *Y02D 30/70* (2020.08)

(58) Field of Classification Search
 CPC .... H04L 1/0018; H04L 1/0017; H04W 24/08; H04W 72/1242; H04W 72/1221; H04W 72/1252; H04W 52/0219; H04W 52/0216; Y02D 30/70
 See application file for complete search history.

(56) References Cited

U.S. PATENT DOCUMENTS

| | | | |
|---|---|---|---|
| 2009/0323641 A1 | 12/2009 | Futagi et al. | |
| 2010/0182973 A1* | 7/2010 | Kim | H04L 1/0015 370/329 |
| 2011/0212742 A1 | 9/2011 | Chen et al. | |
| 2012/0236782 A1* | 9/2012 | Bucknell | H04W 72/1221 370/315 |
| 2014/0313908 A1 | 10/2014 | Da et al. | |
| 2015/0245326 A1 | 8/2015 | Rune et al. | |
| 2015/0334653 A1* | 11/2015 | Ang | H04W 52/0219 370/311 |
| 2016/0007280 A1 | 1/2016 | Ktenas et al. | |

\* cited by examiner

SCHEDULER AND METHODS THEREIN FOR SCHEDULING DATA TRANSMISSION IN A WIRELESS COMMUNICATION SYSTEM

TECHNICAL FIELD

Embodiments herein relate to a scheduler and methods therein for scheduling data transmission in a wireless communication system. In particular, they relate to scheduling data transmission enabling controlled packing and buffering of data before transmission.

BACKGROUND

A wireless communication system usually comprises a plurality of base stations, which may also be referred to as access nodes or access points, eNodeB (eNB) or NodeB. Each base station comprises a radio unit communicating with a plurality of wireless communication devices. Wireless communication devices may be referred to as user equipments (UE), mobile telephones, wireless terminals, mobile terminals, mobile stations, cellular telephones, smart phones, laptops, tablets and phablets, i.e. a combination of a smartphone and a tablet with wireless capability. There is usually a core network in the wireless communication system. The core network comprises a network controller which communicates with the plurality of base stations as a handling unit or a controller for different radio access technologies.

In a base station, e.g. of a Long Term Evolution (LTE) network, incoming data streams are packed into a number of resource blocks instantly upon reaching a baseband scheduler in the base station. LTE uses Orthogonal Frequency Division Multiplexing (OFDM) for the downlink (DL), i.e. from the base station to the UE to transmit the data over many narrow band carriers of 180 kHz each. The basic LTE downlink physical resource can be seen as a time-frequency grid. That is the OFDM uses a large number of narrow sub-carriers for multi-carrier transmission to carry data. The OFDM symbols are grouped into resource blocks. The resource blocks have a total size of 180 kHz in the frequency domain and 0.5 ms in the time domain. Each 1 ms Transmission Time Interval (TTI) consists of two slots. Each user equipment, UE, is allocated a number of resource blocks in the time-frequency grid. The scheduler sorts the resource blocks packed with the incoming data according to identities of UEs which are selected or scheduled to be transmitted in the next Transmission Time Interval (TTI). The resource blocks are then directly transmitted by the radio unit over an air interface to the UEs.

Therefore, the traditional scheduler is built to minimize latency and maximize robustness by scheduling the data as soon as possible and utilizing the available Physical Resource Blocks (PRB). The scheduler will preferably select a more robust Modulation and Coding Scheme (MCS) such as Quadrature phase-shift keying (QPSK) before changing to 16 Quadrature Amplitude Modulation (16QAM) or a higher order QAM if there are still available PRBs. The scheduling of many PRBs with relatively low modulation order means that the radio unit needs more energy to transmit as more subcarriers are needed to transmit the data, which will cause undesired power consumption and transmitted radio frequency (RF) energy.

SUMMARY

It is therefore an object of embodiments herein to provide an improved scheduler and method for scheduling data transmission in a wireless communication system.

According to a first aspect of embodiments herein, the object is achieved by a method performed in a scheduler for scheduling data transmission in a wireless communication system. The wireless communication system comprises a plurality of base stations, each base station comprising one or more radio units communicating with a plurality of wireless communication devices. The scheduler buffers data packets in a buffer. The scheduler monitors the status of the buffer. When the buffer contains a data packet which is associated with a priority level higher than a priority level of a predefined priority threshold, or when the total amount of data packets in the buffer reaches a predefined Buffer Threshold Set Point, the scheduler selects modulation and coding scheme for the buffered data packets and sends the buffered data packets with selected MCS to the radio unit for transmission.

According to a second aspect of embodiments herein, the object is achieved by a scheduler for scheduling data transmission in a wireless communication system. The wireless communication system comprises a plurality of base stations, each base station comprising one or more radio units communicating with a plurality of wireless communication devices. The scheduler is configured to buffer data packets in a buffer. The scheduler is further configured to monitor the status of the buffer. When the buffer contains a data packet which is associated with a priority level higher than a priority level of a predefined priority threshold, or when the total amount of data packets in the buffer reaches a predefined Buffer Threshold Set Point, the scheduler is configured to select modulation and coding scheme for the buffered data packets and send the buffered data packets with selected MCS to the radio unit for transmission.

The scheduler according to embodiments herein will buffer data packets before they are forwarded to the radio unit for transmission. This buffering of data packets will enable the radio unit to enter micro-sleep transmission (u-sleep TX) mode, i.e. the power amplifier in the radio unit may be shut down during some time, e.g. several TTIs in 5G system or during some symbols in LTE system, when nothing is sent. This buffering will also force the scheduler to use a higher order MCS, e.g. move from QPSK to 16QAM or higher, when possible. This will reduce the transmitted RF power for the same amount of user data. That is the scheduler according to embodiments herein enables the radio unit to send more data at the same amount of RF output power than a traditional scheduler does.

The embodiments herein provide a more energy efficient way of transmitting data from a base station by buffering data with lower priority, but still letting data with higher priority to go through without delay.

Therefore, the embodiments herein provide an improved scheduler and method for scheduling data transmission in a wireless communication system.

BRIEF DESCRIPTION OF THE DRAWINGS

Examples of embodiments will be described in more detail with reference to attached drawings in which.

DETAILED DESCRIPTION

Figure 1:
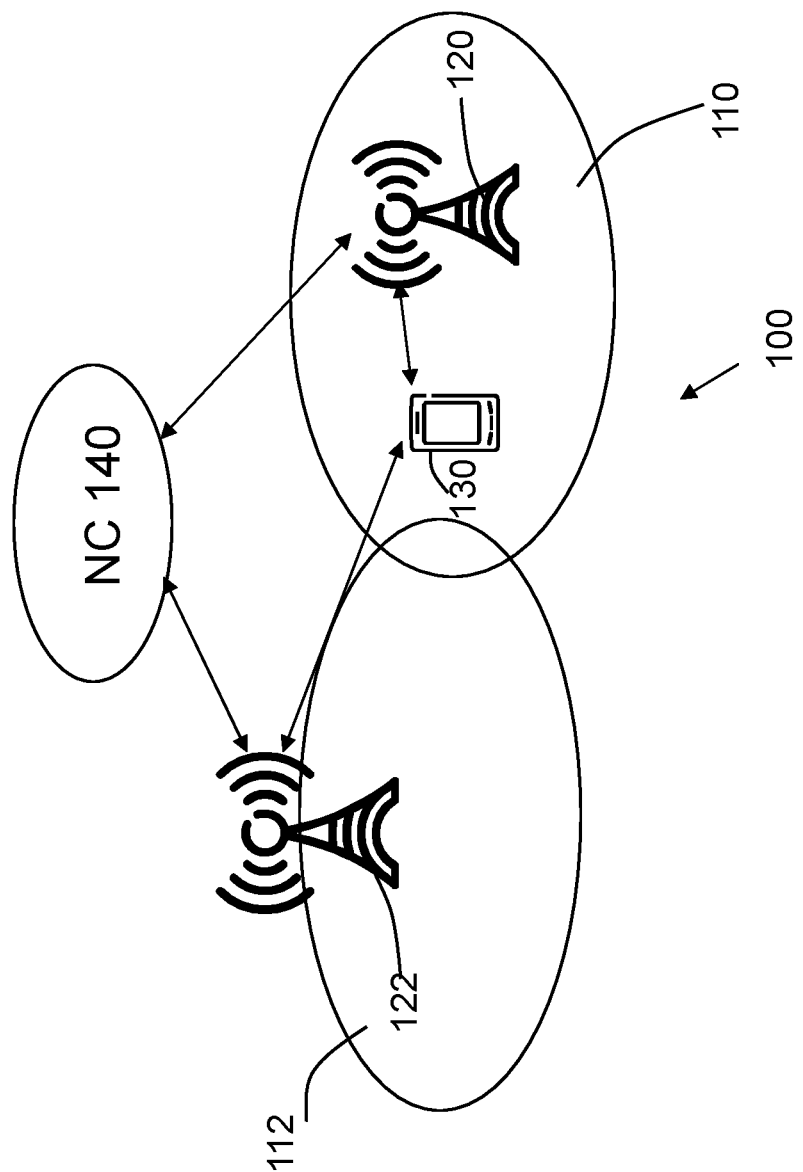
FIG. 1 is a schematic block diagram illustrating embodiments of a wireless communication system.

FIG. 1 depicts an example of a wireless communication system 100 in which embodiments herein may be implemented. The wireless communication system 100 may be any wireless system or cellular network, such as a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), a Fourth Generation (4G) network, a Fifth Generation (5G) network etc.

The wireless communication system 100 comprises a plurality of cells whereof two, a first cell 110 comprises a first Access Node (AN) 120 and a second cell 112 comprises a second Access Node 122 are depicted in FIG. 1. The first Access Node 120, the second Access Node 122 are network access nodes which each may be, for example, a base station, such as eNB, an eNodeB, or an Home Node B, an Home eNode B, a Relay, or any other network access node capable to serve a wireless communication device, such as a user equipment or a machine type communication device in a wireless communication network.

A a plurality of wireless communication devices operates in the wireless communication system 100, where a first wireless communication device 130 is depicted in FIG. 1. The wireless communication device 130 may be a user equipment (UE), a mobile wireless terminal or a wireless terminal, a mobile phone, a computer such as e.g. a laptop, a Personal Digital Assistants (PDAs) or a tablet computer, sometimes referred to as a phablet, with wireless capability, a sensor or actuator with wireless capabilities or any other radio network units capable to communicate over a radio link in a wireless communication network.

The wireless communication network may further comprise a Network Controller 140 which communicates with the first and second access nodes and acts as a handling unit or a controller for different Radio Access Technologies.

Please note that the terms "UE" "user equipment" and wireless communication device are used interchangeably in this document.

Figures 2, 3:
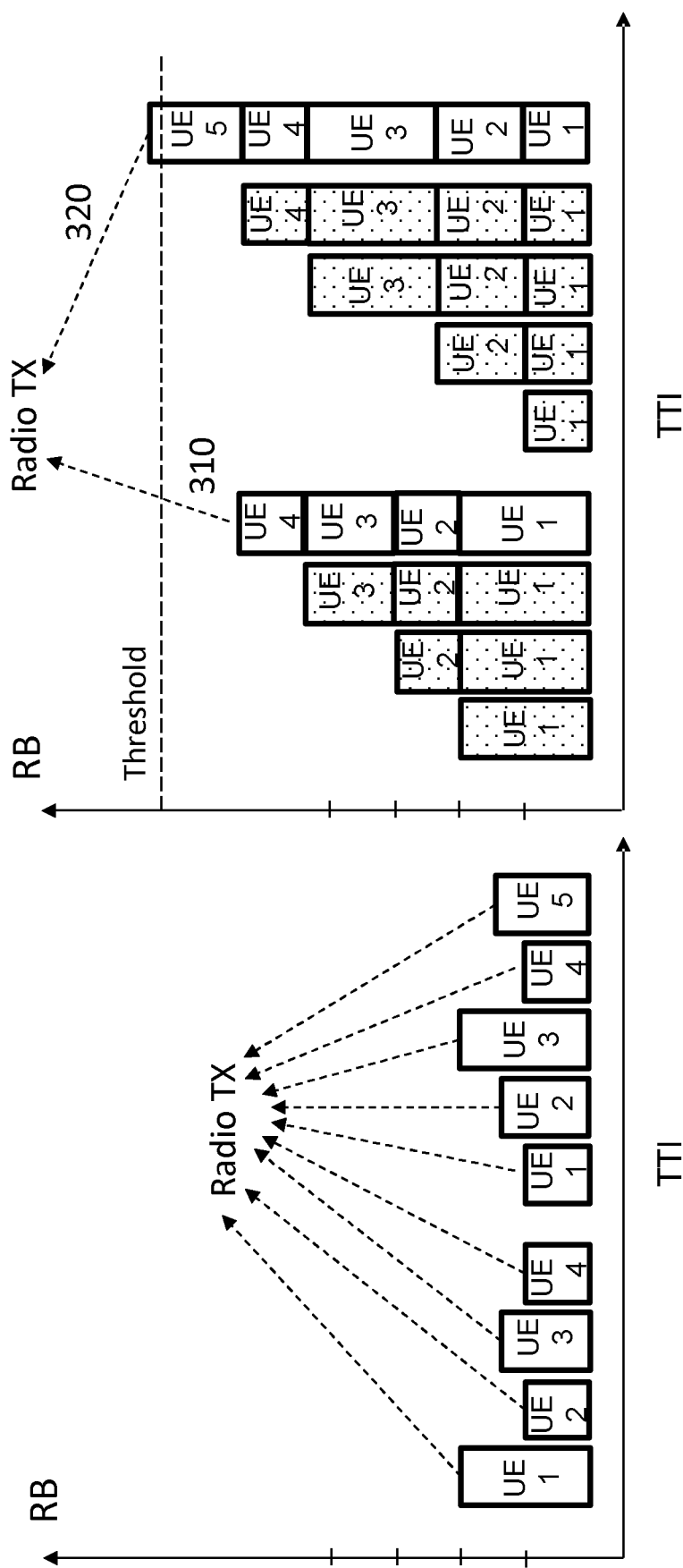
FIG. 2 is a block diagram illustrating a scheduler according to prior art.
FIG. 3 is a block diagram illustrating a scheduler according to embodiments herein.

FIG. 2 depicts how a traditional scheduler packs the incoming data to resource blocks (RBs) and forwards the RBs for transmitting during TTIs.

As shown in FIG. 2, the traditional scheduler packs incoming data streams into a number of RBs instantly upon they reaching the scheduler. The incoming data streams are usually associated with respective UE identity. The scheduler sorts the resource blocks packed with the incoming data according to the identities of UEs which are to be transmitted in the next TTI, such as UE1, UE2, UE3, UE4, UE5 shown in FIG. 2. There are usually more than one UEs in each TTI. For simplification, FIG. 2 only shows one UE in each TTI. The resource blocks are forwarded to the radio unit and directly transmitted by the radio unit over an air interface to the different UEs, as shown by dotted arrows in FIG. 2. In this way, the radio unit does not have or seldom has any opportunity for entering micro-sleep transmission (u-sleep TX) mode because there is most often something to be transmitted even though there are not so many RBs on each transmission during each TTI. So the power amplifier in the radio unit cannot be shut down.

The scheduler keeps track of the order of the UEs in a transmission queue. If there is more data in the buffers than what is possible to be sent, the UEs that were not scheduled to be transmitted to will be moved ahead in the transmission queue.

FIG. 3 depicts an example of how the scheduler packs the incoming data to resource blocks (RBs) and forwards the RBs for transmitting during TTIs according to embodiments herein. For illustration, the same data packets as in FIG. 2 is incoming to the scheduler.

As shown in FIG. 3, the scheduler according the embodiments herein buffers the incoming data streams in a buffer, e.g. a UEs buffer. In the buffer, the data is separable, that is the data are sorted depending on their UE identity, their priority or QCI (Quality of Service Class Identifier) value, and UE place in the transmission queue. In other words, there is one sub-buffer per UE in the buffer according to UE identity. The scheduler monitors the buffer status, i.e. the content of the buffer and amount of data in the buffer. The content of the buffer is the data packets associated with UEs and their priority. The amount of data in the buffer is how many data packets or RBs are in the buffer. For example, when a data packet associated with UE1 arrives in the buffer, the scheduler according the embodiments herein checks the priority or QCI class of this data packet, i.e. the content of the buffer is checked. If the priority of this data packet is lower than a predefined priority threshold, PT, it will not forward the data packet associated with UE1 to the radio unit for transmission. So the data packet associated with UE1 will remain in its sub-buffer in the buffer during a first TTI.

The same applies to data packets associated with UE2, UE3. That is the data packets associated with UE2, UE3 will remain in their respective sub-buffers in the buffer during the next two TTIs, if their priority are lower than the predefined threshold PT. When a data packet associated with UE4 arrives in the buffer, the priority of this data packet is detected as high, e.g. higher than the predefined threshold PT, and such data should be sent without delay. It is efficient to empty all possible sub-buffers for transmission. Thus, the scheduler will select a modulation and coding scheme, MCS, for the data packets associated with respective UE identities, i.e. UE1, UE2, UE3, UE4, having contents in the buffer. Then the scheduler will forward the data packets to the radio unit for transmission in an order of a transmission queue. This forwarding is shown in FIG. 3 by a dotted arrow 310. If not all data packets in the buffer can be sent, the one with lowest priority will stay in the buffer until next iteration. The longer a data packet stays in the buffer, the higher its priority will go until it will be forced to go out of the buffer. In the case of the forwarding 310, the data packets associated to UE4 will force an emptying the data packets of the buffer, or as much data packets as possible.

The buffer contents is monitored each TTI. If no high priority data is received, more downlink data packets are buffered until the amount of data packets in the buffer reaches a predefined buffer level threshold, i.e. a Buffer Threshold Set Point, BTSP. This is shown to the right of the FIG. 3, where the scheduler buffers the data packets associated with UE1, UE2, UE3, UE4 and UE5 in the buffer. When the amount of data packets in the buffer reaches the predefined threshold BTSP, the scheduler will select a modulation and coding scheme, MCS, for the data packets associated with respective UE identities in the buffer. Then the scheduler will forward the data packets to the radio unit for transmission in an order of the transmission queue. This forwarding is shown in FIG. 3 by a dotted arrow 320.

The selection of MCS may result in such a low MCS that it will not be possible to transmit all the data packets in the buffer. In that case, the UEs that were not scheduled to be transmitted to, will be moved ahead in the transmission queue and their data packets will remain in the respective sub-buffers. This applies also in the case shown to the left in FIG. 3, where the buffer contains the high priority data even if the buffer fill level is below BTSP.

Therefore, the scheduler according to embodiments herein buffers data packets before they are forwarded to the radio unit for transmission. This buffering of data packets will enable the radio unit to enter micro-sleep transmission mode, i.e. the power amplifier in the radio unit may be shut down during some symbols or TTIs when nothing is sent. For example, as shown in FIG. 3, during those TTIs where the dot filled blocks located, the radio unit may enter into micro-sleep transmission mode as these data packets will not be transmitted directly but will remain in the buffer for some TTIs.

Figure 4:
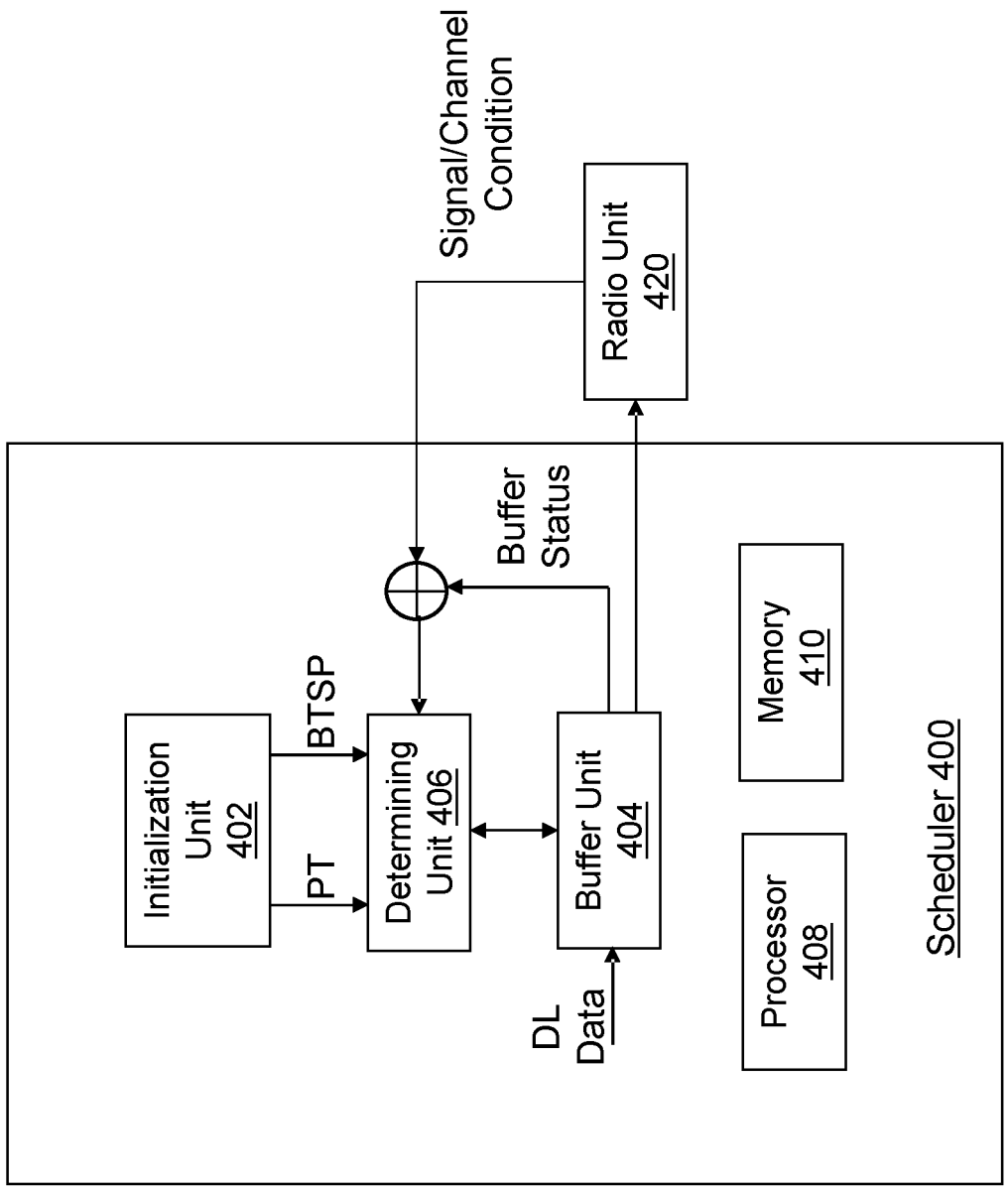
FIG. 4 is a schematic block diagram illustrating a scheduler according to embodiments herein.

FIG. 4 is a schematic block view of a scheduler 400 according to embodiments herein. The scheduler comprises a initialization unit 402 configured to initialize or set the predefined thresholds, such as the predefined priority threshold (PT), the predefined buffer threshold, i.e. the Buffer Threshold Set Point (BTSP) etc.

Table 1 illustrates the standardized QCI characteristics as defined in the 3GPP TS 23.203 standard "Policy and Charging Control Architecture". Every QCI, Guaranteed Bit Rate (GBR) and Non-GBR, is associated with a Priority level. Priority level 0.5 is the highest Priority level. If congestion is encountered, the lowest Priority level traffic would be the first to be discarded.

i.e. the rows associated with defined GBR, Packet Delay Budget (PDB), Packet Error Loss (PELR) and services or bearers.

For example, the priority threshold may be set to PT=6. This means that for QCIs with priorities values lower than PT, there should be no scheduled delay. Note that higher priority levels correspond to lower priority values. So the data packets associated with QCIs which have a priority level higher than the priority level of the PT, e.g. Conversational Voice (priority value=2), Conversational Video (priority value=4), Real Time Gaming (priority value=3), IMS Signaling (priority value=1), such as Voice over LTE (VoLTE) etc., will be scheduled for transmission directly without delay.

The BTSP may be set to a percentage, e.g. 80%, of the total capacity of the buffer or a fixed number, e.g. a certain number of resource blocks, depending on operator choice, radio hardware etc.

The scheduler further comprises a buffer unit 404 configured to receive and store downlink (DL) data. The buffer unit 404 may comprise or may be divided into sub-buffers for each UE.

The scheduler 400 further comprises a determining unit 406 configured to monitor the buffer status and to determine if the content of the buffer should be emptied, i.e. if the data packets in the buffer should be forwarded to the radio unit 420 for transmission. The determination is based on two conditions, i.e. the content of the buffer regarding priority level and amount of data in the buffer.

TABLE 1

| QCI | Resource Type | Priority | Packet Delay Budget | Packet Error Loss | Example Services |
| --- | --- | --- | --- | --- | --- |
| 1 | GBR | 2 | 100 ms | $10^{-2}$ | Conversational Voice |
| 2 | GBR | 4 | 150 ms | $10^{-3}$ | Conversational Video |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 65 | GBR | 0.7 | 75 ms | $10^{-2}$ | Mission Critical user plane Push To Talk voice (e.g., MCPTT) |
| 66 | GBR | 2 | 100 ms | $10^{-2}$ | Non-Mission-Critical user plane Push To Talk voice |
| 5 | non-GBR | 1 | 100 ms | $10^{-6}$ | IMS Signaling |
| 6 | non-GBR | 6 | 300 ms | $10^{-6}$ | Video (Buffered Streaming) TCP-Based (for example, www, email, chat, ftp, p2p and the like) |
| 7 | non-GBR | 7 | 100 ms | $10^{-3}$ | Voice, Video (Live Streaming), Interactive Gaming |
| 8 | non-GBR | 8 | 300 ms | $10^{-6}$ | Video (Buffered Streaming) TCP-Based (for example, www, email, chat, ftp, p2p and the like) |
| 9 | non-GBR | 9 | 300 ms | $10^{-6}$ | Video (Buffered Streaming) TCP-Based (for example, www, email, chat, ftp, p2p and the like). Typically used as default bearer |
| 69 | non-GBR | 0.5 | 60 ms | $10^{-6}$ | Mission Critical delay sensitive signalling (e.g., MC-PTT signalling) |
| 70 | non-GBR | 5.5 | 200 ms | $10^{-6}$ | Mission Critical Data (e.g. example services are the same as QCI 6/8/9) |

The scheduler 400 according to embodiments herein may be configured to take the QCI values in Table 1 above into account. The operator of the network of which the scheduler is a part, may select to adapt the parameters of the table according to current preferences.

The priority threshold PT, e.g. a QCI Threshold Set Point, may be set relative to the QCI information in Table 1 including the priorities defined for the various QCI values, The scheduler 400 will empty the buffer if the buffer content, i.e. any data packets associated with QCI values which has a priority value lower than the predefined PT, or in other words, if the buffer contains a higher priority data packet which is not to be delayed.

The scheduler 400 will also empty the buffer if the total amount of data packets or fill level in the buffer is greater than the predefined BTSP, i.e. if the total amount of data packets reaches the predefined Buffer Threshold Set Point (BTSP).

The scheduler 400 will empty the buffer by first selecting a modulation and coding scheme (MCS) for each UE in the transmission queue based on the data packets in the respective UE sub-buffer and on Signal/Channel Condition feedback information regarding the concerned UE received from a radio unit 420 as shown in FIG. 4. Then the data packets with selected MCS is forwarded to the radio unit 420 for transmission.

Therefore, according to the embodiments herein, the determining unit 406 is further configured to select a modulation and coding scheme (MCS) for each UE scheduled for transmission according to a transmission queue. This may be done by first picking the UE depending on its place in the transmission queue, then selecting the best MCS that should be used for the data transmission based on channel quality of each UE. The best Modulation and Coding Scheme (MCS) is chosen by maximizing the supported throughput with a given target Block Error Rate (BLER). In this way, a user experiencing a higher Signal-Interference-Noise-Ratio (SINR) will be served with higher bitrates, i.e. using MCS with higher order, whereas a cell-edge user, or in general a user experiencing bad channel conditions, will maintain active connections, but at the cost of a lower throughput, i.e. using MCS with lower order.

Therefore, according to some embodiments, the MCS may be selected based on the amount of data packets to be transmitted by the radio unit and radio channel conditions. The signal or radio channel condition information per UE identity may be sent by the UE to the radio unit 420 and forwarded by the radio unit 420 to the scheduler 400.

In the case when the signal or channel conditions of some UEs result in a MCS with a lower modulation order, the scheduler 400 will use this lower modulation order and fit as much data packets to be transmitted as possible in the buffer to the available RBs and keep the rest in the buffer.

So the determining unit 406 may be further configured to determine an amount of data to be transmitted by the radio unit based on the selected MCS. The maximum amount of data to fit in available resource blocks is depending on the selected MCS.

The scheduler 400 is further configured to send or forward the data packets from the buffer to the radio unit 420 for each scheduled UE for transmission in an order of the transmission queue until the amount of data to be transmitted by the radio unit 420 is reached.

If the buffer is not empty, the scheduler 400 is further configured to move data packets associated with UEs scheduled to be transmitted ahead in the transmission queue.

The above processes, i.e. monitoring buffer status, selecting MCS and forwarding data packets are repeated as more downlink data packets are received, i.e. for each TTI. According to the embodiments herein, the scheduler 400 buffers incoming data packets, selects MCS for the buffered data packets before they are forwarded to the radio unit for transmission. This buffering of data packets will enable the radio unit to enter micro-sleep transmission mode as discussed above with reference to FIG. 3. Further, this buffering will also force the scheduler to use a higher order MCS, e.g. move from QPSK to 16QAM or higher, when possible. This will reduce the transmitted RF power for the same amount of user data. That is the scheduler 400 according to embodiments herein enables the radio unit to send more data at the same amount of RF output power than a traditional scheduler does.

By monitoring the status of the buffer, the scheduler 400 according to the embodiments herein provides a more energy efficient way of transmit data from a base station by buffering data with lower priority but still letting data with higher priority to go through without delay.

Figure 5:
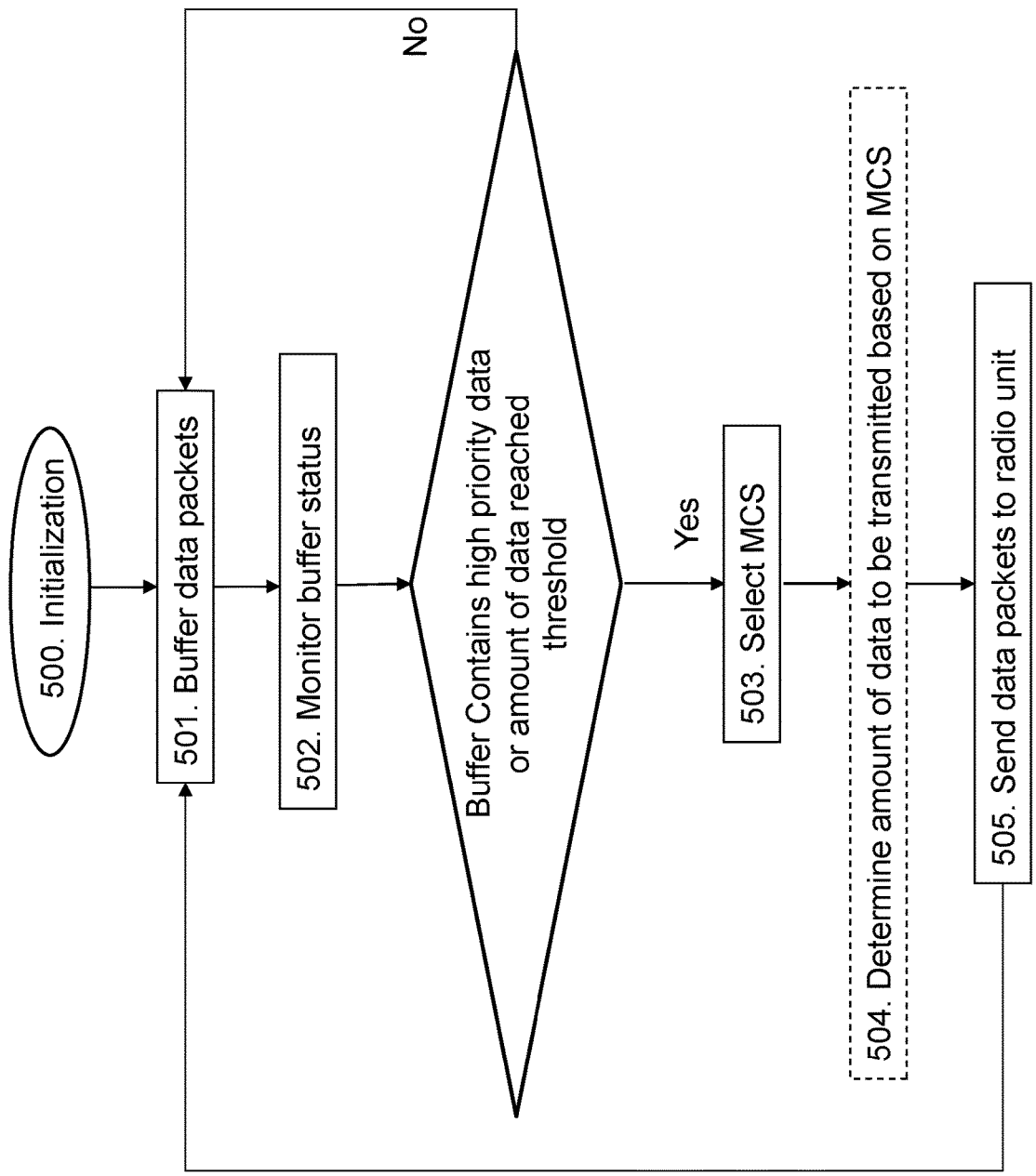
FIG. 5 is a flowchart illustrating a method performed in a scheduler according to embodiments herein.

Example embodiments of a method performed in the scheduler 400 for scheduling data transmission in a wireless communication system 100 will now be described with reference to FIG. 5. The wireless communication system 100 comprises a plurality of base stations, each base station comprising one or more radio units communicating with a plurality of wireless communication devices.

According to the embodiments herein, the method comprises the following actions. Some actions may be taken in the reverse order or be performed simultaneously.

Action 500

This action is an initialization procedure. During the initialization procedure, the scheduler 400 initializes or sets the predefined thresholds, such as predefined priority threshold PT and BTSP.

According to some embodiments, the PT may be set relative to Quality of Service Class Identifier, QCI, information associated with the data packets.

According to some embodiments, the predefined BTSP may be set by a certain number of resource blocks (RBs), or a relative RB fill level or a percentage of available RBs in one TTI. For example, the predefined BTSP may be set to 80% of available RBs, i.e. for a 20 MHz cell, it corresponds to 80 RBs being allocated in current TTI.

According to some embodiments, the predefined BTSP may be set by a relative buffer fill level or a percentage, e.g. 80%, of the total capacity of the buffer.

Action 501

The scheduler 400 buffers data packets in a buffer, e.g. a UEs buffer. Incoming data streams are received and stored in the buffer. The data in the buffer is separable, that is the data are sorted depending on their UE identity, their priority or QCI class, and UE place in a transmission queue. In other words, this can be regarded as one sub-buffer per UE in the buffer according to UE identity.

Action 502

The scheduler 400 monitors status of the buffer to determine if the content of the buffer should be emptied, i.e. if the data packets in the buffer should be forwarded to the radio unit 420 for transmission. The status of the buffer comprises the content of the buffer and amount of data in the buffer. For example, the scheduler 400 monitor the number of PRBs needed for transmission in this TTI with regard to the threshold BTSP and a priority of the data packets.

According to some embodiments, the scheduler 400 may estimate the number of Physical Resource Block (PRBs) needed to send all data packets stored in the UEs buffer based on Channel Quality Indicator (CQI). If the amount of data packets in the buffer is larger than the capacity of a cell, e.g. the first cell 110, for one TTI, the number of PRBs is limited to maximum number of PRBs for this cell.

If the condition is met, i.e. when the buffer contains a data packet which is associated with a priority level higher than the priority level of a predefined Priority Threshold (PT), or when the total amount of data packets in the buffer reaches a predefined Buffer Threshold Set Point (BTSP), the scheduler 400 performs the following actions:

Action 503

The scheduler 400 selects modulation and coding scheme (MCS) for the buffered data packets, e.g. based on channel condition and amount of PRBs needed to be transmitted.

According to some embodiments, the MCS may be selected based on the amount of data packets to be transmitted by the radio unit 420 and radio channel conditions. That is the MCS may be selected as the highest of: a) the maximum modulation order possible to fit the buffered data packets to be transmitted; and b) the modulation order required based on radio channel conditions.

Action 504

This action is optional. The scheduler 400 may determine an amount of data to be transmitted by the radio unit 420 based on the selected MCS. This is performed in the case when the signal or channel conditions of some UEs result in a MCS with a lower modulation order. Then the scheduler 400 will use this lower modulation order and fit as many data packets to be transmitted as possible in the buffer to the available RBs and keep the rest in the buffer. Note that the spectrum has to be shared with other UEs depending on data priority and should be taken into account when determining the amount of data to be transmitted.

Action 505

The scheduler 400 sends the buffered data packets with the selected MCS to the radio unit for transmission.

Those skilled in the art will appreciate that the initialization unit 402, the buffer unit 404, the determining unit 406 described above with reference to FIG. 4 may be referred to as one unit, a combination of analog and digital circuits, one or more processors, such as processor 408 depicted in FIG. 4, configured with software and/or firmware and/or any other digital hardware performing the function of each unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The scheduler 400 may further comprise a memory 410 comprising one or more memory units. The memory 410 is arranged to be used to store information, e.g. the priority list, the transmission queue, CQI and data, as well as configurations to perform the methods herein when being executed in the scheduler 400.

The embodiments herein in the scheduler 400 for scheduling data transmission in the wireless communication system 10, may be implemented through one or more processors, such as the processor 408 in the scheduler 400 together with computer program code for performing the functions and actions of the embodiments herein. The program code mentioned above may also be provided as a computer program product, for instance in the form of a data carrier carrying computer program code for performing the embodiments herein when being loaded into the scheduler 400. One such carrier may be in the form of a CD ROM disc. It is however feasible with other data carriers such as a memory stick. The computer program code may furthermore be provided as pure program code on a server and downloaded to the scheduler 400.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a scheduler for scheduling data transmission in a wireless communication system, wherein the wireless communication system comprises a plurality of base stations, each base station of the plurality of base stations comprising one or more radio units communicating with a plurality of wireless communication devices, the method comprising:
   buffering data packets in a buffer, wherein the data packets in the buffer are sorted based on an identity of a wireless communication device of the plurality of wireless communication devices, a Quality of Service Class Identifier (QCI) value associated with the data packets, and a position of the wireless communication device in a transmission queue;
   monitoring a status of the buffer; and
   when the buffer contains a data packet of the buffered data packets which is associated with a priority level higher than a priority level of a predefined priority threshold (PT):
      selecting a modulation and coding scheme (MCS) for the buffered data packets; and
      sending the buffered data packets with the selected MCS to the one or more radio units for transmission.

2. The method according to claim 1, wherein the predefined PT is associated with QCI information associated with the data packet.

3. The method according to claim 1, wherein the MCS is selected based on an amount of the buffered data packets to be transmitted by the one or more radio units and radio channel conditions.

4. The method according to claim 1, further comprising determining an amount of the buffered data packets to be transmitted by the one or more radio units based on the selected MCS, wherein determining the amount of the buffered data packets to be transmitted by the one or more radio units is further based on a relation between signal or channel conditions of the plurality of wireless communication devices and a modulation order of an MCS resulted due to the signal or the channel conditions of the plurality of wireless communication devices.

5. A scheduler for scheduling data transmission in a wireless communication system, wherein the wireless communication system comprises a plurality of base stations, each base station of the plurality of base stations comprising one or more radio units communicating with a plurality of wireless communication devices, the scheduler comprising:
   one or more processors and a memory, the memory storing computer program code executable by the one or more processors whereby the scheduler is configured to:
      buffer data packets in a buffer, wherein the data packets in the buffer are sorted based on an identity of a wireless communication device of the plurality of wireless communication devices, a Quality of Service Class Identifier (QCI) value associated with the data packets, and a position of the wireless communication device in a transmission queue;
      monitor a status of the buffer; and
      when the buffer contains a data packet of the buffered data packets which is associated with a priority level higher than a priority level of a predefined priority threshold (PT):
         select a modulation and coding scheme (MCS) for the buffered data packets; and
         send the buffered data packets with the selected MCS to the one or more radio units for transmission.

6. The scheduler according to claim 5, wherein the predefined PT is associated with QCI information associated to the data packet.

7. The scheduler according to claim 5, wherein the MCS is selected based on an amount of the buffered data packets to be transmitted by the one or more radio units and radio channel conditions.

8. The scheduler according to claim 5, being further configured to determine an amount of the buffered data packets to be transmitted by the one or more radio units based on the selected MCS, wherein the determination of the amount of the buffered data packets to be transmitted by the one or more radio units is further based on a relation between signal or channel conditions of the plurality of wireless communication devices and a modulation order of an MCS resulted due to the signal or the channel conditions of the plurality of wireless communication devices.

9. A base station comprising:
    one or more radio units configured to communicate with a plurality of wireless communication devices; and
    a scheduler, wherein the scheduler comprises one or more processors and a memory, the memory storing computer program code executable by the one or more processors whereby the scheduler is configured to:
        buffer data packets in a buffer, wherein the data packets in the buffer are sorted based on an identity of a wireless communication device of the plurality of wireless communication devices, a Quality of Service Class Identifier (QCI) value associated with the data packets, and a position of the wireless communication device in a transmission queue;
        monitor a status of the buffer; and
        when the buffer contains a data packet of the buffered data packets which is associated with a priority level higher than a priority level of a predefined priority threshold (PT):
            select a modulation and coding scheme (MCS) for the buffered data packets; and
            send the buffered data packets with the selected MCS to the one or more radio units for transmission.

10. The base station according to claim 9, wherein the predefined PT is associated with QCI information associated to the data packet.

11. The base station according to claim 9, wherein the MCS is selected based on an amount of the buffered data packets to be transmitted by the one or more radio units and radio channel conditions.

12. The base station according to claim 9, wherein the scheduler is further configured to determine an amount of the buffered data packets to be transmitted by the one or more radio units based on the selected MCS, wherein the determination of the amount of the buffered data packets to be transmitted by the one or more radio units is further based on a relation between signal or channel conditions of the plurality of wireless communication devices and a modulation order of an MCS resulted due to the signal or the channel conditions of the plurality of wireless communication devices.

\* \* \* \* \*